(12) United States Patent
Retief et al.

(10) Patent No.: US 9,416,431 B2
(45) Date of Patent: Aug. 16, 2016

(54) TREATMENT OF MINERALS

(75) Inventors: Willem Liebenberg Retief, Kosmosdal (ZA); Nelius Dempers Retief, legal representative, Kosmosdal (ZA); Johannes Theodorus Nel, Kempton Park (ZA); Wilhelmina Du Plessis, Conturion (ZA); Philippus Lodewyk Crouse, Pretoria (ZA); Johannes Petrus Le Roux, Moreletapark (ZA)

(73) Assignee: The South African Nuclear Energy Corporation Limited (ZA)

( * ) Notice: Subject to any disclaimer, the term of this patent is extended or adjusted under 35 U.S.C. 154(b) by 372 days.

(21) Appl. No.: 13/395,267

(22) PCT Filed: Sep. 9, 2010

(86) PCT No.: PCT/IB2010/054067
§ 371 (c)(1),
(2), (4) Date: Aug. 31, 2012

(87) PCT Pub. No.: WO2011/030301
PCT Pub. Date: Mar. 17, 2011

(65) Prior Publication Data
US 2012/0328496 A1 Dec. 27, 2012

(30) Foreign Application Priority Data
Sep. 11, 2009 (ZA) .................. 2009/06343

(51) Int. Cl.
| C01B 7/00 | (2006.01) |
| C01C 1/16 | (2006.01) |
| C22B 3/10 | (2006.01) |
| C22B 34/10 | (2006.01) |
| C22B 34/12 | (2006.01) |
| C22B 34/14 | (2006.01) |
| C22B 34/24 | (2006.01) |

(52) U.S. Cl.
CPC . *C22B 3/10* (2013.01); *C22B 34/10* (2013.01); *C22B 34/1213* (2013.01); *C22B 34/14* (2013.01); *C22B 34/24* (2013.01); *Y02P 10/234* (2015.11)

(58) Field of Classification Search
USPC .......................................... 423/462, 470, 471
See application file for complete search history.

(56) References Cited

U.S. PATENT DOCUMENTS

| 2,288,727 A | 7/1942 | Mayer |
| 4,107,264 A | 8/1978 | Nagasubramanian |
| 2012/0328496 A1* | 12/2012 | Retief et al. ............. C22B 3/10 423/62 |

FOREIGN PATENT DOCUMENTS

| AU | 428 758 | 10/1972 |
| AU | 428758 B2 * | 10/1972 ............. C01G 49/06 |
| RU | 2 365 647 C1 | 8/2009 |

OTHER PUBLICATIONS

International Search Report from the European Patent Office for International Application No. PCT/IB2010/054067, mailing date Jan. 28, 2011.

*Primary Examiner* — James McDonough
(74) *Attorney, Agent, or Firm* — Finnegan, Henderson, Farabow, Garrett & Dunner LLP

(57) ABSTRACT

A process for treating a feedstock is provided. The feedstock comprises a mineral and/or a metal oxide/silicate derived from or associated with a mineral. The process comprises treating the feedstock by reacting, in a reaction step, the mineral and/or the metal oxide/silicate derived from or associated with a mineral, with an ammonium acid fluoride having the generic formula $NH_4F \cdot xHF$, wherein $1 < x \leq 5$. An ammonium fluorometallate compound is produced as a reaction product.

19 Claims, 3 Drawing Sheets

TREATMENT OF MINERALS

THIS INVENTION relates, broadly, to the treatment of minerals. It relates in particular to a process for treating a mineral and/or a metal oxide/silicate derived from or associated with a mineral.

In order to manufacture downstream chemicals from naturally occurring minerals or to obtain metals from minerals as starting material, the mineral must be solubilized and the solubilized intermediate products that are formed must be purified to conform to specifications of, inter alia, purity as dictated by end use applications. Nuclear-grade zirconium metal, for example, has to conform to very stringent purity specifications. Typically, for nuclear grade zirconium metal, a hafnium content of less than 100 ppm is required from a thermal neutron cross-section absorption perspective. Similar stringent purity requirements apply for aluminum fluoride used as precursor for the production of aluminum and in the fluoroaluminate glass industry, as well as for tantalum and niobium compounds used in the electronics industry. However, minerals, such as zircon, bauxite, tantalite, pyrochlor and ilmenite, are members of a group of minerals that contain metal oxides and silicates in natural abundance and which are notoriously difficult to solubilize. Typically, high temperature digestion in concentrated acids over long periods of time, high temperature alkaline melting processes, or high temperature carbochlorination processes are required to achieve solubilization of such materials. Thus, these minerals, as well as the oxides and silicates of the elements associated therewith, are extremely inert and difficult to solubilize.

It is thus an object of the present invention to provide a means whereby various naturally occurring minerals, as well as their associated metal oxides and silicates, can more readily be treated to obtain useful intermediate and final products therefrom.

Thus, according to the invention, there is provided a process for treating a feedstock comprising a mineral and/or a metal oxide/silicate derived from or associated with a mineral, the process comprising treating the feedstock by reacting, in a reaction step, the mineral and/or the metal oxide/silicate derived from or associated with a mineral, with an ammonium acid fluoride having the generic formula $NH_4F.xHF$, wherein $1<x\leq 5$, to produce an ammonium fluorometallate compound as a reaction product.

By 'metal oxide/silicate' is meant a metal oxide, a metal silicate or both a metal oxide and a metal silicate.

The feedstock may comprise a zirconia-based mineral, e.g. zircon and/or a metal oxide/silicate derived from a zirconia-based mineral, e.g. zirconia and/or silica. Instead, the feedstock may comprise a mineral selected from tantalite, columbite, pyrochlor, ilmenite, rutile, monazite, bauxite, and mixtures of any two or more thereof, and/or a metal oxide/silicate derived from such a mineral. Yet further, the feedstock may comprise a mixture of different metal oxides and/or different metal silicates associated with minerals, which may be the minerals hereinbefore disclosed. The mineral tantalite has the generic formula $[(Fe,Mn)(Ta,Nb)_2O_6]$, while pyrochlor is generally formulated as $(Na,Ca)_2Nb_2O_6(OH,F)$. Bauxite is a mineral containing aluminium and silicon, ilmenite contains iron and titanium and rutile contains titania. The inventors have found that all of these difficult to solubilize feedstock materials are surprisingly susceptible to forming ammonium fluorometallates when treated with ammonium acid fluoride in accordance with the invention. It is further expected that, as also indicated hereinafter, metal fluorides formed by treatment according to the process of the invention may be separated and/or purified by selective volatilisation thereof.

The ammonium acid fluoride is a liquid. Accordingly, the process is a wet process, particularly since a stoichiometric excess of the ammonium acid fluoride will usually be used.

When the feedstock is zirconia-based, it may comprise dissociated zircon, $ZrO_2.SiO_2$ or 'DZ'. The reaction step may then proceed in accordance with reaction 1.1 in which $x=1.5$ (unbalanced):

$$ZrO_2.SiO_2 + NH_4F.1.5HF \rightarrow (NH_4)_3ZrF_7 + (NH_4)_2SiF_6 + H_2O \qquad 1.1$$

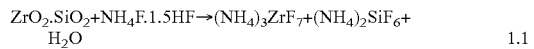

$(NH_4)_3ZrF_7$ and $(NH_4)_2SiF_6$ are thus produced as reaction products.

Instead, when the feedstock is zirconia-based, it may comprise at least partially desilicated dissociated zircon which has a desilicated zirconia component, $ZrO_2$. The desilicated zirconia component may then react in accordance with reaction 1.2 (unbalanced) in which $x=1.5$:

$$ZrO_2 + NH_4F.1.5HF \rightarrow (NH_4)_3ZrF_7 + H_2O \qquad 1.2$$

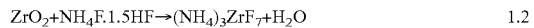

$(NH_4)_3ZrF_7$ is thus produced as a reaction product. The feedstock may comprise partially desilicated dissociated zircon or wholly desilicated dissociated zircon. It will be appreciated that when the dissociated zircon is only partially desilicated, some $(NH_4)_2SiF_6$ will also form as a reaction product.

Dissociated zircon and partially/wholly desilicated dissociated zircon are thus metal oxides derived from the mineral zircon.

The dissociated zircon, when used, can be that obtained by any suitable process, particularly a thermal process. Thus, for example, it can be that obtained by destroying the crystal matrix of zircon ($ZrSiO_4$) by heating it to a high temperature in a plasma furnace or a plasma generator, under oxidizing, inert or reducing conditions. Zircon is a mineral which is abundantly available at relatively low cost, but is chemically inert. Thus, inert zircon mineral is rendered amenable to chemical processing in accordance with the invention, by means of the plasma dissociation. During the plasma dissociation, zircon is dissociated into separate zirconia ($ZrO_2$) and silica ($SiO_2$) mineral phases, with the product commonly designated as dissociated zircon ('DZ'), plasma dissociated zircon ('PDZ'), or $ZrO_2.SiO_2$.

The reaction, for PDZ, may be conducted at a temperature below about 150° C., typically between about 50° C. and about 100° C., for example at about 55° C., with $(NH_4)_3ZrF_7$ and $(NH_4)_2SiF_6$ being formed as reaction products in accordance with reaction (1.1). The reaction period will be set by, amongst others, the feedstock used. Thus, for PDZ, it may be between a few seconds, e.g. 5-10 seconds, and 5 minutes, typically about 2 minutes, depending on the particle size of the dissociated zircon and other reaction conditions. For other feedstocks, such as ilmenite, the reaction period may be considerably longer, and can be at least 100 minutes, e.g. between 100 minutes and 250 minutes.

Similar reaction conditions as set out above apply for the treatment of other extremely inert minerals, such as those mentioned above, or extremely inert metal oxides or silicates derived from or associated with such minerals. As an example, tantalum oxide (which is a metal oxide which occurs naturally in the mineral tantalite) may be fluorinated with ammonium acid fluoride in accordance with reaction 1.3, where $x=2.5$:

$$Ta_2O_5 + 4NH_4F.2.5HF \rightarrow 2(NH_4)_2TaF_7 + 5H_2O \qquad 1.3$$

$(NH_4)_2TaF_7$ is thus produced as a reaction product.

As another example, ilmenite ($FeTiO_3$) may be fluorinated with ammonium acid fluoride. This may be in accordance with reaction 1.4, where x=2:

$$FeTiO_3 + 3NH_4F.2HF \rightarrow (NH_4)_2TiF_6 + FeF_2 + 3H_2O + NH_4F \quad \quad 1.4$$

The process may include thermally treating the ammonium fluorometallate compound reaction product in order to effect thermal decomposition thereof, thereby to form an anhydrous fluoride, e.g. $ZrF_4$, $AlF_3$, $TaF_5$, $NbF_5$, $TiF_4$ etc., from which desired products can be produced.

Thus, thermal decomposition of the ammonium fluorometallate may be effected at a temperature of above about 300° C., typically at about 450° C., in accordance with the following reactions (2).

$$(NH_4)_3ZrF_7 \rightarrow ZrF_4 + NH_3 + HF \quad \quad (2.1)$$

$$(NH_4)_3AlF_6 \rightarrow AlF_3 + NH_3 + HF \quad \quad (2.2)$$

$$(NH_4)_2TaF_7 \rightarrow TaF_5 + NH_3 + HF \quad \quad (2.3)$$

$$(NH_4)_2TiF_6 \rightarrow TiF_4 + NH_3 + HF \quad \quad (2.4)$$

In the thermal treatment step, the ammonium fluorometallate is thus thermally decomposed to the corresponding fluoride and $NH_4F$, with ammonia ($NH_3$) and hydrogen fluoride (HF) being released from the $NH_4F$ as further decomposition products. $NH_3$ and HF vapours released during decomposition may again react with each other to form ammonium fluoride in, for instance, a condenser trap.

In cases where silicon is present in the mineral matrix, such as in the case of zircon (viz. equation 1.1), the process may include an initial thermal treatment step, following the reaction step, and ahead of the thermal decomposition hereinbefore described which would then constitute a second thermal treatment step. In the initial thermal treatment step, volatilization of the silicon compound, e.g. $(NH_4)_2SiF_6$, is effected at a temperature between about 250° C. and about 300° C., typically at about 280° C., in accordance with reaction (3).

$$(NH_4)_2SiF_6(s) \rightarrow (NH_4)_2SiF_6(g) \quad \quad (3)$$

The process may, in particular, be conducted in a closed reactor, in order to prevent loss of gaseous components such as reactive HF and $NH_3$. The reactor may typically have three distinct adjacent temperature zones, such that the reaction step, the first thermal treatment step and the second thermal treatment step are each effected in a respective temperature zone, with the material passing sequentially from the one zone to the next. Thus, the reaction step will be effected in a first relatively cool temperature zone, the first thermal treatment step in a second temperature zone which is at a higher temperature than the first temperature zone, and the second thermal treatment step in a third temperature zone adjacent the second temperature zone and which is at a higher temperature than the second temperature zone. Preferably, the reactor is a rotary kiln.

The invention will now be described by way of non-limiting example, with reference to the accompanying drawings.

Figure 1:
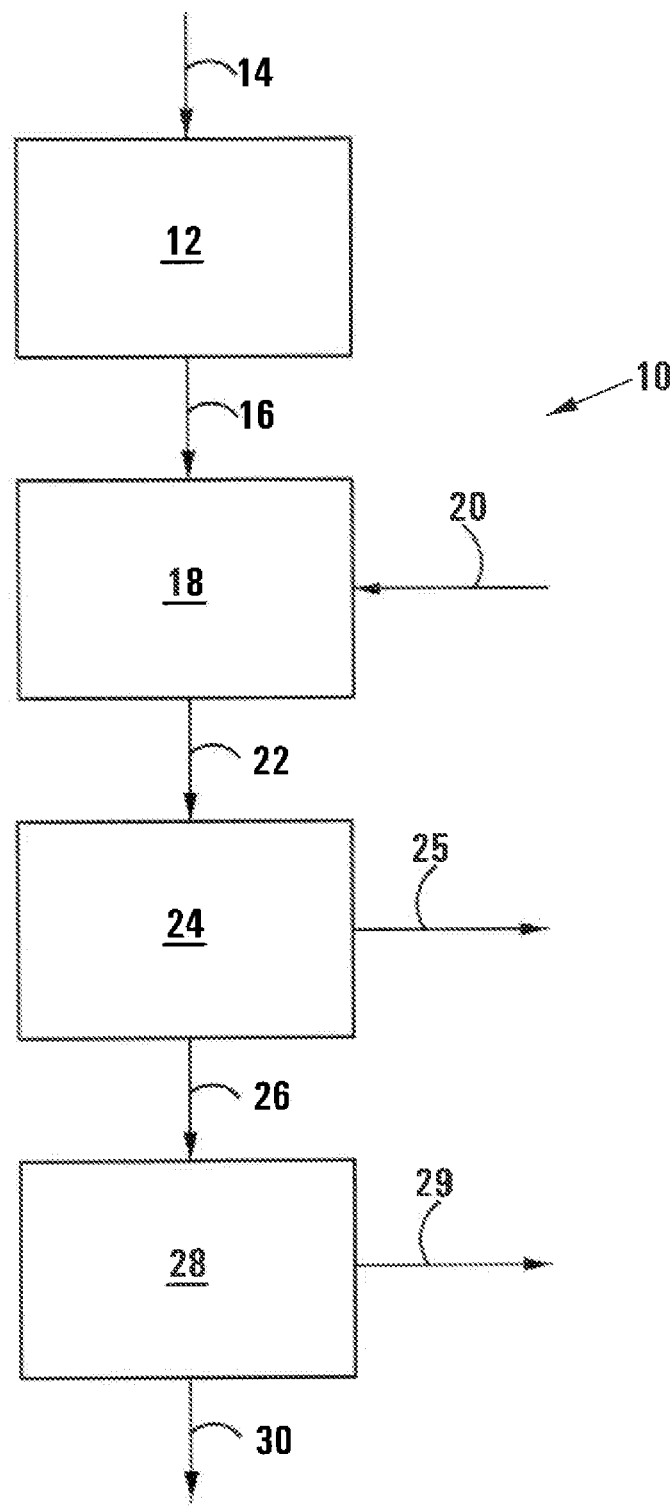
FIG. 1 is a simplified flow diagram of a process according to the invention for treating a mineral.

In FIG. 1, the feedstock is in the form of a zircon oxide/zircon silicate, viz plasma dissociated zircon (PDZ), which is derived from the mineral zircon. The PDZ is treated with $NH_4F.1.5HF$ according to reaction (1.1).

In FIG. 1, reference numeral 10 generally indicates a process for treating PDZ.

Upstream of the process 10, there is provided a plasma dissociation stage 12. A zircon ($ZrSiO_4$) feed line 14 leads into the stage 12. A PDZ transfer line 16 leads from the stage 12 to a reaction step or stage 18, which forms part of the process 10. An ammonium acid fluoride ($NH_4F.1.5HF$) feed line 20 also leads into the stage 18. A reaction product transfer line 22 leads from the stage 18 to a first thermal treatment step or stage 24. An optional first thermal stage volatile products withdrawal line 25 leads from stage 24 to an off-gas treatment or recovery means (not shown). A first thermal stage product transfer line 26 leads from the stage 24 to a second thermal treatment step or stage 28. A second thermal stage product line 30 leads from the stage 28. An optional second thermal treatment step volatile products withdrawal line 29 leads from stage 28 to an off-gas treatment or recovery means (not shown).

In use, $ZrSiO_4$ is fed, along the feed line 14, into the plasma dissociation stage 12. In the stage 12, the zircon is dissociated, by means of plasma dissociation, into PDZ. The PDZ passes along the flow line 16 to the reaction stage 18.

$NH_4F.1.5HF$ is fed, in addition to the PDZ, into the reaction stage 18 along feed line 20. In the stage 18, the $NH_4H.1.5HF$ and PDZ react according to reaction (1.1), at a temperature of about 55° C. The reaction period is typically about 2 minutes. $(NH_4)_3ZrF_7$ and $(NH_4)_2SiF_6$ are thus formed as reaction products, which pass into the first thermal treatment stage 24 along transfer line 22.

In the first thermal treatment stage 24, the $(NH_4)_3ZrF_7$ and $(NH_4)_2SiF_6$ are subjected to thermal treatment at a temperature of about 280° C. and a reaction period of about 5 minutes, leading to volatilization of the $(NH_4)_2SiF_6$ in accordance with reaction (3). The volatile $(NH_4)_2SiF_6$ is withdrawn from stage 24 via the withdrawal line 25. The residual $(NH_4)_3ZrF$ passes to the second thermal treatment stage 28 along transfer line 26.

In the second thermal treatment stage 28, the $(NH_4)_3ZrF_7$ is subjected to thermal treatment at a temperature of about 450° C. and for a reaction period of about 10 minutes, leading to the decomposition of the $(NH_4)_3ZrF_7$ into $ZrF_4$ in accordance with reaction (2.1). The $ZrF_4$ is withdrawn along the product line 30. Gaseous HF and $NH_3$ are also formed in the second thermal treatment stage 28, which is withdrawn from stage 28 via the withdrawal line 29.

The reaction stage 18, the first thermal treatment stage 24 and the second thermal treatment stage 28 are typically provided by a rotary kiln (not illustrated) having three distinct temperature zones, each zone representing one of the stages 18, 24, and 28. It will be appreciated that the transfer lines 22 and 26 respectively then represent the transfer of reaction product and $(NH_4)_3ZrF$ from one temperature zone to the next, within the kiln.

In the following examples "% conversion" or "conversion efficiency" means the fraction of feedstock material lost during the process in terms of volatile products, expressed as a percentage, i.e.

$$\text{Conversion} = \left(1 - \frac{\text{mass solid residue}}{\text{mass feed material}}\right) \times 100$$

EXAMPLE 1

In a laboratory scale experiment of the reaction step or stage 18 of the process 10, PDZ (dissociated to a degree of about 94%) as starting material, was reacted with an excess of the stoichiometrically required amount of $NH_4F.1.5HF$, to ensure that maximum conversion of PDZ is achieved. Thus, for every 1 g of PDZ, 10 g of $NH_4F.1.5HF$ were used.

In a first run, the $NH_4F.1.5HF$ (slurry at room temperature) was placed in a PTFE (polytetrafluoroethylene) reaction vessel, or crucible, and was preheated in a water bath to a temperature of 56° C. The reaction vessel was then removed from the water bath, and the accurately weighed PDZ was added to the liquid $NH_4F.1.5HF$. The reaction vessel was shaken carefully for the duration of the reaction period of 8 minutes at a temperature of 56° C.

After the reaction period had elapsed, the reaction was quenched by adding a boric acid solution; thereafter, the solution was filtered and the percentage conversion of PDZ to $(NH_4)_3ZrF_7$ and $(NH_4)_2SiF_6$ was determined.

Figure 2:
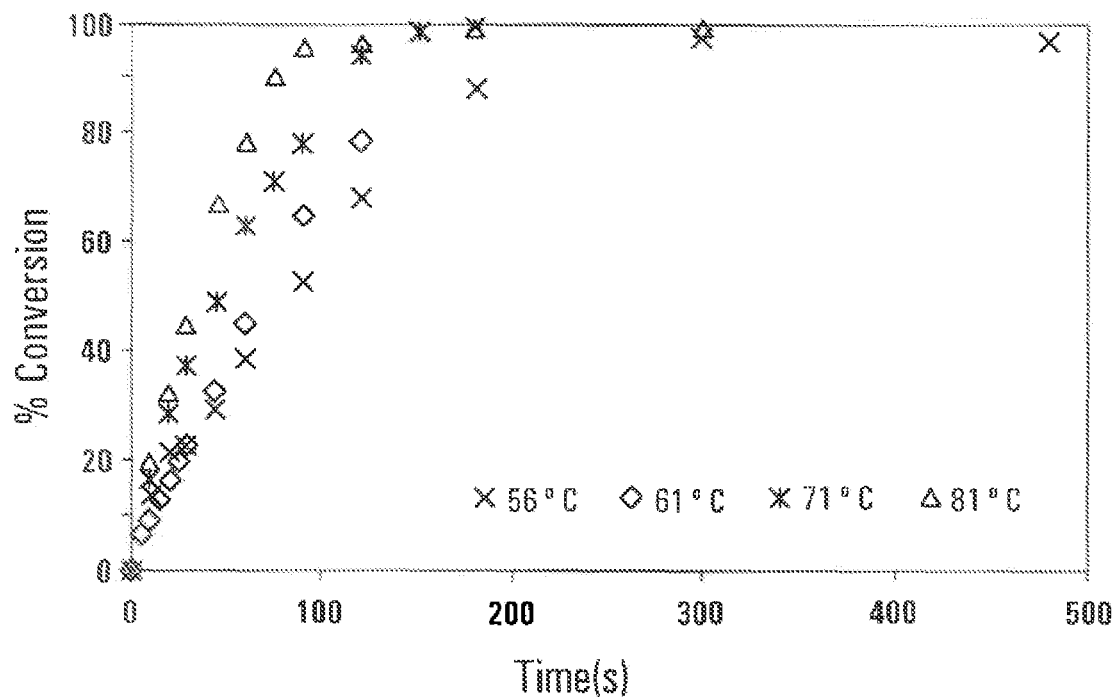
FIG. 2 is a plot of % conversion against time, for Example 1, i.e. the reaction of PDZ with $NH_4F.1.5HF$ at different temperatures.

It was found that essentially complete conversion was achieved within a reaction period of about 5 minutes with only the undissociated zircon portion of about 6% of the PDZ starting material remaining (FIG. 2), since all the reaction products and the surplus $NH_4F.1.5HF$ are water soluble.

In three more runs, the reaction step 18 was repeated at reaction temperatures of 61, 71 and 81° C., respectively (FIG. 2), with similar results and corresponding decreasing reaction times down to about 2 minutes.

EXAMPLE 2

Figure 3:
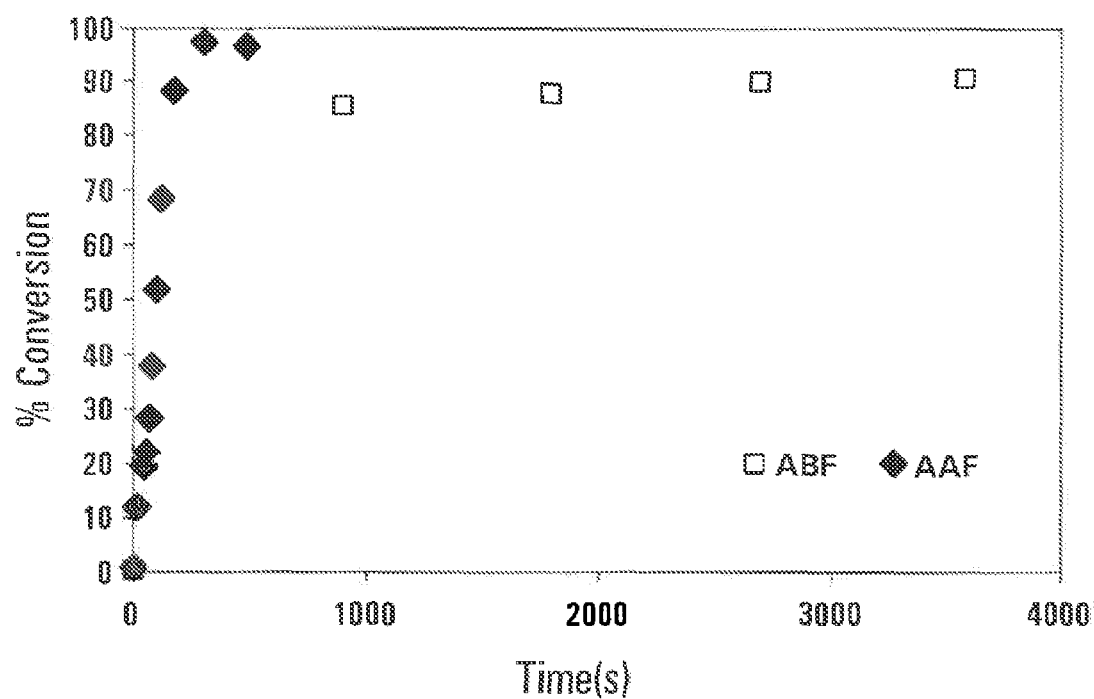
FIG. 3 is a plot of % conversion against time, for Example 2, i.e. a comparison of fluorination capacity between ammonium acid fluoride (AAF, at 56° C.) and ammonium bifluoride (ABF, at 148° C.) on PDZ.

When the fluorination capacity of ammonium acid fluoride (AAF or $NH_4F.xHF$) on PDZ is compared with that of ammonium bifluoride (ABF or $NH_4F.HF$) in the reaction step or stage 18, the significantly higher reactivity of ammonium acid fluoride can be clearly seen (FIG. 3).

EXAMPLE 3

Ilmenite ($FeTiO_3$) was dissolved in ammonium acid fluoride to yield water soluble $(NH_4)_2TiF_6$ and an insoluble residue of unknown composition.

Figure 4:
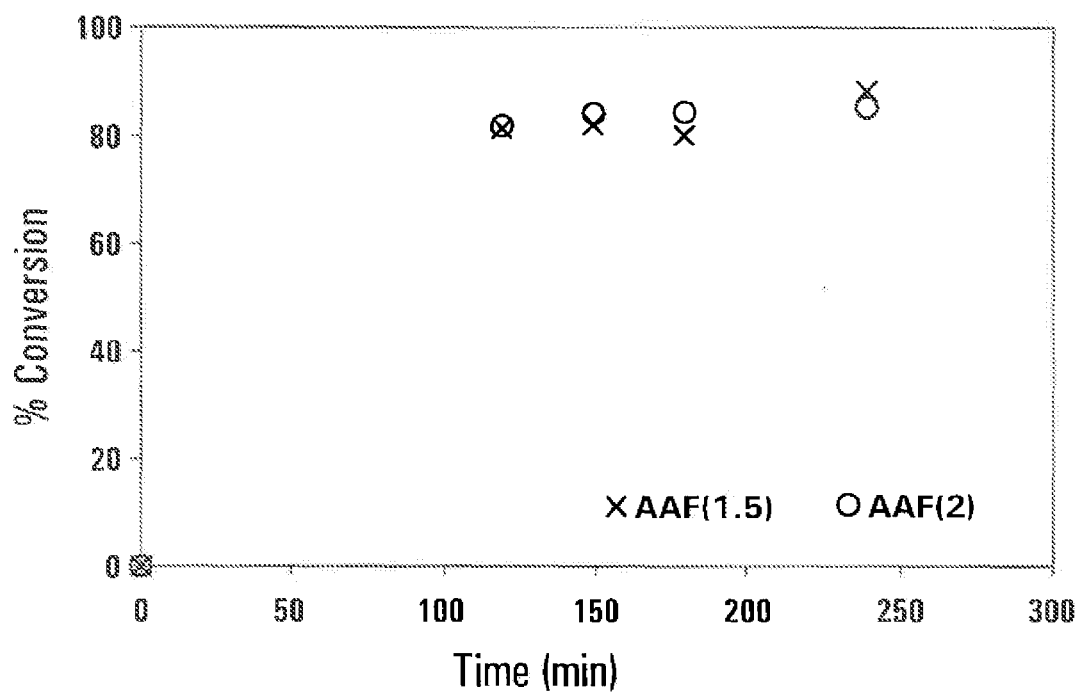
FIG. 4 is a plot of % conversion against time, for Example 3, i.e. the reaction of ilmenite with $NH_4F.1.5HF$ and $NH_4F.2HF$ respectively.

FIG. 4 illustrates the conversion efficiency of the reactions of ilmenite with $NH_4F.xHF$ for x=1.5 and 2 at a reaction temperature of 90° C. It was found that, with ilmenite, the reaction takes place much more slowly than is the case with PDZ. This is because PDZ, being plasma dissociated, is already more susceptible to chemical treatment than natural minerals, such as illustrated by ilmenite.

Figure 5:
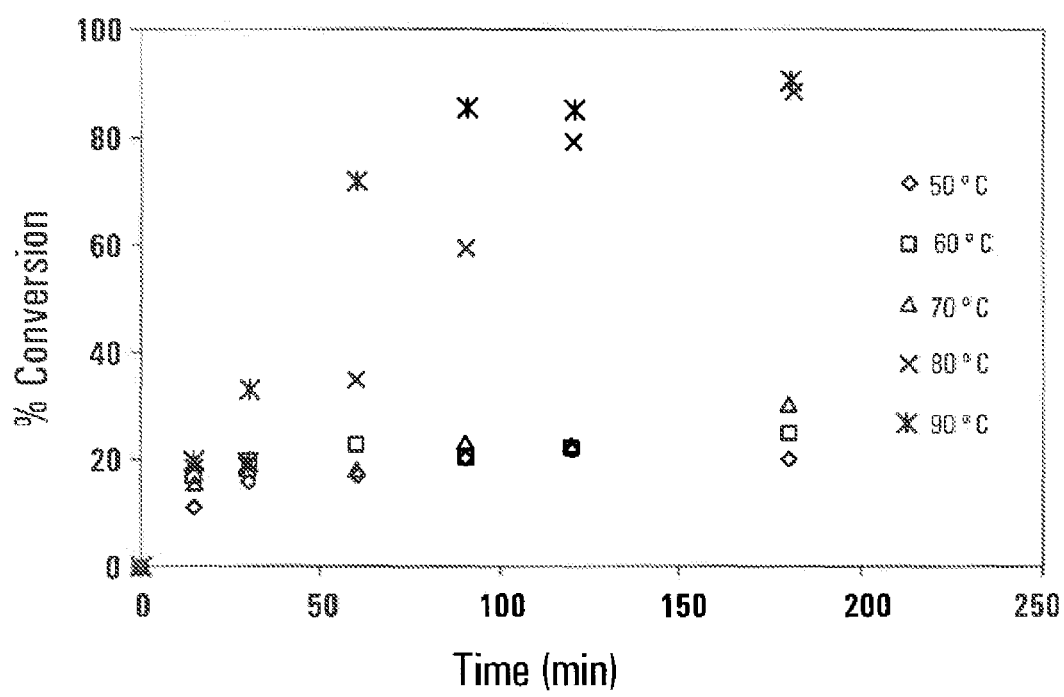
FIG. 5 shows the effect of temperature on the reaction of $NH_4F.1.5HF$ with ilmenite.

FIG. 5 illustrates the positive effect of reaction temperature on the efficiency of the reaction of ilmenite with $NH_4F.1.5HF$. Thus, it can be expected that the reaction rate may be further increased by performing the reaction at still higher temperatures. This may be optimized by standard experimentation.

Thus, the Applicant has found that the invention unexpectedly provides a faster, cost effective manner for obtaining from natural occurring minerals, in particular, but not limited to, zircon in its dissociated form, tantalite, pyrochlor, ilmenite, bauxite, etc. useful products which are amenable to further processing, e.g. to obtain the relevant metals and/or metal oxides as an end product.

Further, the invention provides an anhydrous route for beneficiation of natural occurring minerals, enabling the manufacture of anhydrous fluorides. For instance, $ZrF_4$ is the preferred precursor for a number of applications, rather than hydrous $ZrF_4.H_2O$, which is formed when using a hydrous solubilization route to treat such materials, which has hitherto been the case.

The invention claimed is:

1. A process for treating a feedstock comprising a mineral and/or a metal oxide/silicate derived from or associated with a mineral, the process comprising treating the feedstock by reacting, in a reaction step, the mineral and/or the metal oxide/silicate derived from or associated with a mineral, with an ammonium acid fluoride having the generic formula $NH_4F.xHF$, wherein $2<x\leq5$, and which is a liquid, to produce an ammonium fluorometallate compound as a reaction product.

2. A process according to claim 1, wherein the feedstock comprises a zirconia-based mineral and/or metal oxide/silicate derived from a zirconia-based mineral.

3. A process according to claim 1, wherein the feedstock comprises a mineral selected from tantalite, columbite, pyrochlor monazite and mixtures of any two or more thereof, and/or a metal oxide/silicate derived from such a mineral.

4. A process according to claim 1, wherein the feedstock comprises a mixture of different metal oxides and/or different metal silicates associated with minerals.

5. A process according to claim 3, wherein the feedstock comprises tantalum oxide which is fluorinated with the ammonium acid fluoride in accordance with reaction 1.3 in which x=2.5:

$$Ta_2O_5 + 4NH_4F.2.5HF \rightarrow 2(NH_4)_2TaF_7 + 5H_2O \quad\quad 1.3$$

with $2(NH_4)_2TaF_7$ thus being produced as a reaction product.

6. A process according to claim 1, which includes thermally treating the ammonium fluorometallate compound reaction product in order to effect thermal decomposition thereof, thereby to form an anhydrous fluoride.

7. A process according to claim 6, wherein the thermal treatment of the ammonium fluorometallate compound is effected at a temperature above about 300° C., with the ammonium fluorometallate compound being thermally decomposed to the corresponding fluoride and $NH_4F$, and with ammonia, $NH_3$, and hydrogen fluoride, HF, being released from the $NH_4F$ as further decomposition products.

8. A process according to claim 7, which is carried out in a closed reactor, to prevent loss of gaseous components.

9. A process according to claim 8, wherein the reactor is a rotary kiln.

10. A process according to claim 8, wherein the reaction is carried out for a reaction period of between 5 seconds and 5 minutes.

11. A process according to claim 6, wherein the thermal treatment includes a first thermal treatment step, which follows the reaction step, and which is ahead of the thermal decomposition of the ammonium fluorometallate compound which constitutes a second thermal treatment step.

12. A process according to claim 11, wherein the first thermal treatment step comprises volatilization of the $(NH_4)_2SiF_6$ at a temperature between about 250° C. and about 300° C. in accordance with reaction 3:

$$(NH_4)_2SiF_6(s) \rightarrow (NH_4)_2SiF_6(g) \qquad 3$$

13. A process according to claim 11, which is carried out in a closed reactor, to prevent loss of gaseous components.

14. A process according to claim 13, wherein the reactor has three distinct adjacent temperature zones, such that the reaction step, the first thermal treatment step and the second thermal treatment step each takes place in a separate temperature zone, with the reaction products passing sequentially from the one zone to the next, the reaction step being effected in a first relatively cool temperature zone, the first thermal treatment step being effected in a second temperature zone which is at a higher temperature than the first temperature zone, and the second thermal treatment step being effected in a third temperature zone adjacent the second temperature zone and which is at a higher temperature than the second temperature zone.

15. A process according to claim 13, wherein the reactor is a rotary kiln.

16. A process for treating a feedstock comprising a mineral and/or a metal oxide/silicate derived from or associated with a mineral, the process comprising treating the feedstock by reacting, in a reaction step and at a temperature not exceeding 100° C., the mineral and/or the metal oxide/silicate derived from or associated with a mineral, with an ammonium acid fluoride having the generic formula $NH_4F.xHF$, wherein $2<x\leq5$, and which is a liquid, to produce an ammonium fluorometallate compound as a reaction product.

17. A process according to claim 1 wherein, in respect of the ammonium acid fluoride having the generic formula $NH_4F.xHF$, $2.5\leq x\leq5$.

18. A process according to claim 1 wherein the reaction is conducted at a temperature not exceeding 100° C.

19. A process for treating a feedstock comprising a mineral selected from zircon, tantalite, columbite, pyrochlor, monazite, and mixtures of any two or more thereof, and/or a metal oxide/silicate derived from such a mineral, the process comprising treating the feedstock by reacting, in a reaction step, the mineral and/or the metal oxide/silicate derived from or associated with the mineral, with an ammonium acid fluoride having the generic formula $NH_4F.xHF$, wherein $2<x\cdot5$, and which is a liquid, to produce an ammonium fluorometallate compound as a reaction product.

* * * * *